A. WALKO.
VEGETABLE BOILER.
APPLICATION FILED OCT. 11, 1915.

1,197,082.

Patented Sept. 5, 1916.

Inventor
A. Walko

By A. M. Wilson
Attorney

UNITED STATES PATENT OFFICE.

ANDREW WALKO, OF FLORIDA CITY, FLORIDA.

VEGETABLE-BOILER.

1,197,082.  Specification of Letters Patent.  Patented Sept. 5, 1916.

Application filed October 11, 1915. Serial No. 55,233.

*To all whom it may concern:*

Be it known that I, ANDREW WALKO, a citizen of the United States, residing at Florida City, in the county of Dade and State of Florida, have invented certain new and useful Improvements in Vegetable-Boilers, of which the following is a specification.

This invention relates to certain new and useful improvements in vegetable boilers.

The primary object of the invention is the provision of a boiler especially adapted for cooking vegetables having a foraminous container arranged to provide a circulation of the cooking fluid.

A further object of the device is to provide a two-part cooker which is easy and inexpensive to manufacture, the same being provided with circulating means and adapted to partially cook the articles contained therein with a small amount of fluid and heat, the device being also arranged with a cover-locking means for preventing the handle member from becoming overheated.

A still further object of the invention is the provision of a removable foraminous container arranged with means for circulating the cooking fluid and also for pocketing a portion thereof to prevent burning of the articles during the cooking operation.

With these general objects in view and others that will appear as the nature of the invention is better understood, the same consists in the novel combination and arrangement of parts hereinafter more fully described, illustrated in the accompanying drawings, and pointed out in the appended claim.

Figure 1:
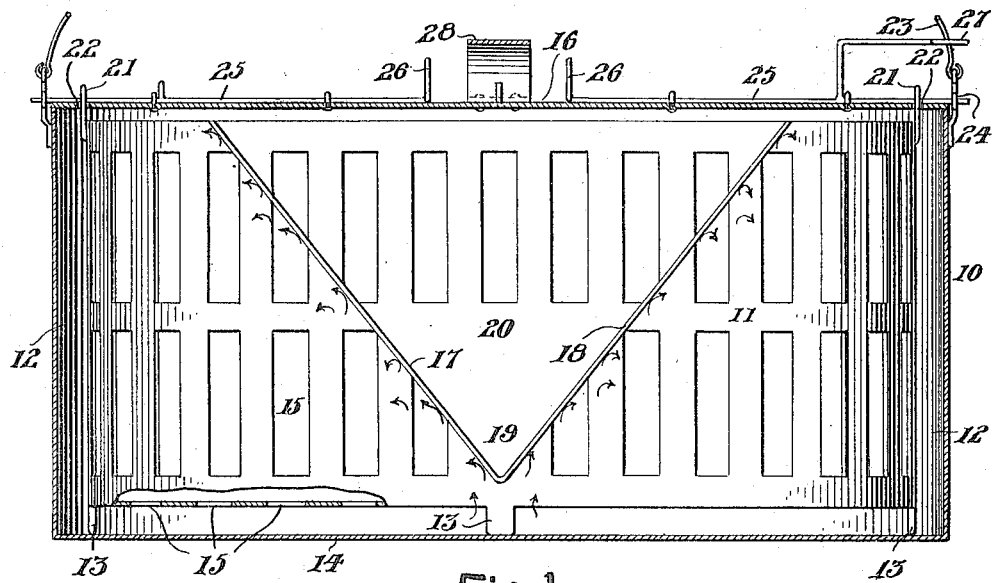
Figure 2:
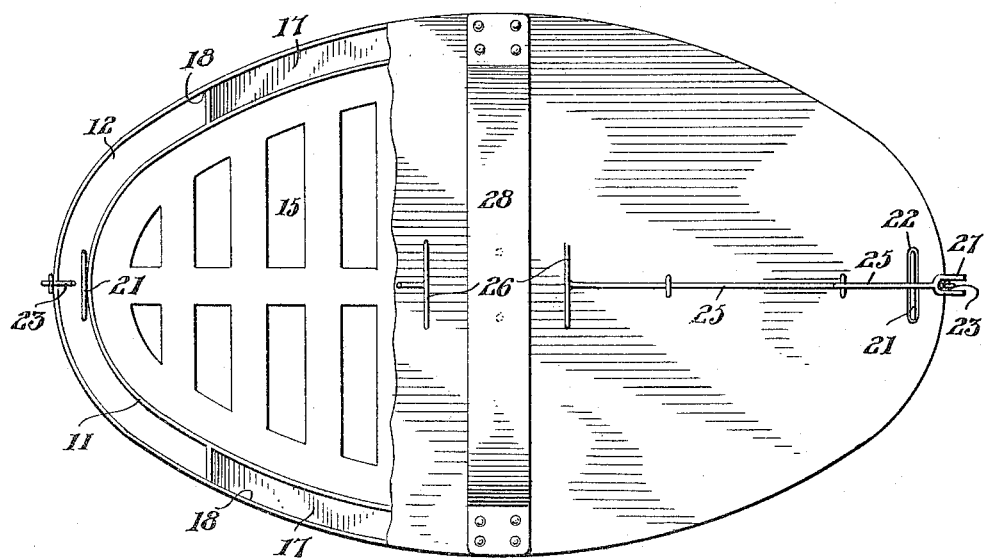

In the drawings forming a part of this application and in which like-designating characters refer to corresponding parts throughout the several views:—Figure 1 is a central longitudinal sectional view through the outer portion of the device with the container shown in side elevation therein and partially broken away, and Fig. 2 is a top plan view thereof with the lid partially broken away.

It being understood that the device is designed for cooking such articles as vegetables by a boiling operation, the invention broadly consists in the provision of a boiler or kettle 10 for the reception of fluid such as water or milk and adapted to be placed over the desired form of heater, while the edibles to be cooked are placed within the removable openwork container 11.

The container 11 is of the same contour as the boiler 10 but of less diameter than the same thus providing an annular fluid space 12 between the adjacent walls of the container and boiler when the container is operatively positioned in the boiler as illustrated in the drawings. Supporting legs 13 are provided for the container which rest upon the boiler bottom 14 and elevate the container a desirable distance above the same and substantially equal to the width of the said space 12. The container is provided with slotted openings 15 through its bottom and sides, the said container being open at the top and unprovided with a lid with the exception that the removable cover 16 which is provided for the boiler 10 overlies the said container.

A substantially V-shaped deflector plate 17 is carried upon each longitudinal opposite side of the container 11 and conforms to the curvature of the container and boiler walls between which the said deflectors are positioned when the device is in operation. The outer edges 18 of the deflectors 17 closely engage the adjacent inner wall of the boiler so as to trap a small quantity of water within a chamber 19 formed in the lower end of each of the deflectors, it being noted that the adjacent side 20 of the container is imperforate.

Upright handles 21 are provided upon the opposite ends of the container 11 and are adapted to project through slots 22 in the boiler lid 16, while a swinging bail 23 is provided for the said lid being swingingly mounted upon loops 24 at the opposite ends of the said boiler. Slidable locking bolts 25 are positioned upon the lid 16 being adapted to extend through the container handles 21 and the boiler loops 24 when projected. Operating ends 26 are provided upon the bolts 25 to be grasped for moving the same. A hook 27 is carried by one of the bolts 25 adapted to receive the bail 23 when the latter is positioned upright and thereby retain the said bail away from contact with the heated boiler or the heater, thus maintaining the bail in cool condition. A transversely-arranged handle 28 is also provided upon the lid 16 substantially centrally thereof.

The complete operation of the device will be at once apparent from the above-detailed description thereof in that the vegetables or other articles to be cooked are placed within the container 11 which latter is then inserted into the boiler 10 accompanied by a sufficient quantity of fluid, the chambers 19 are filled with the fluid and the lid 16 is placed in position and the bolts 25 projected, it is to be understood that the water is retained in the chamber 19 by reason of the close engagement of the deflector edges 18 with the inner adjacent wall of the boiler 10.

The deflectors 17 act as conductors for the steam arising from the boiling fluid within the boiler 10 and forces the steam to take the direction indicated by the arrows in Fig. 1 of the drawing and thus affords a circulation thereof for more perfectly cooking the articles within the container.

During the boiling of the fluid, the articles within the container 11 are cooked, while in the event of a boiling away of all of the fluid within the main portion of the boiler 10, a sufficient quantity will still be retained within the side chambers 19 to allow a continued steaming of the container contents and thus prevent the articles from burning down until such time as the operator becoming aware of the absence of sufficient fluid replenishes the same. The placing of the container above the floor of the boiler, also assists in preventing the articles from being burned and while the present form of the invention is the preferred one, minor changes may be made if desired which fall within the spirit and scope of the invention as claimed.

What I claim as new is:—

A device of the class described comprising an outer imperforate and an inner openwork structure, the latter being provided with inclined deflecting surfaces arranged closely to contact with the outer structure, the opposite sides of the inner structure within the deflecting surfaces being imperforate from the lower ends to points substantially midway the height of the inner receptacle whereby to provide a receptacle to contain liquid during the operation of cooking maintained in the inner structure.

In testimony whereof I affix my signature.

ANDREW WALKO.

Copies of this patent may be obtained for five cents each, by addressing the "Commissioner of Patents, Washington, D. C."